United States Patent [19]

Gäumann et al.

[11] 4,107,007

[45] Aug. 15, 1978

[54] PROCESS FOR THE RECOVERY OF LEAD FROM SCRAPPED LEAD BATTERIES

[75] Inventors: Andreas F. Gäumann, Feldmeilen; Visnja Dancilovic-Matulas, Wettingen, both of Switzerland

[73] Assignee: Gesellschaft zur Förderung der Forschung an der Eidgenössischen Technischen Hochschule, Zürich, Switzerland

[21] Appl. No.: 795,418

[22] Filed: May 9, 1977

[30] Foreign Application Priority Data

May 14, 1976 [CH] Switzerland ............... 6059/76

[51] Int. Cl.$^2$ ............... C25C 1/18; C25C 1/00
[52] U.S. Cl. ............... 204/116; 204/114
[58] Field of Search ............... 204/114, 115, 116, 140, 204/146

[56] References Cited

U.S. PATENT DOCUMENTS

| | | | |
|---|---|---|---|
| 1,752,356 | 4/1930 | Smith | 204/116 |
| 1,911,604 | 5/1933 | Calbeck | 204/114 |
| 2,689,253 | 9/1954 | Robertson et al. | 260/451 |
| 2,826,490 | 3/1958 | Neumann | 75/77 |
| 2,966,350 | 12/1960 | Neumann | 266/33 |
| 3,300,043 | 1/1967 | Adsit | 209/10 |
| 3,892,563 | 7/1975 | La Point | 75/97 |

*Primary Examiner*—T. M. Tufariello
*Attorney, Agent, or Firm*—Blanchard, Flynn, Thiel, Boutell & Tanis

[57] ABSTRACT

A process for the recovery of lead from scrapped lead batteries includes mechanically comminuting them and freeing them from battery acid. Then the battery scrap is treated with an alkaline reagent solution to convert lead oxide and sulphate to dissolved lead compounds, pure lead is recovered by electrolyzing the solution, and metallic lead components of the scrap are recovered by a physical separation from the scrap remaining after the dissolution treatment.

16 Claims, 2 Drawing Figures

PROCESS FOR THE RECOVERY OF LEAD FROM SCRAPPED LEAD BATTERIES

BACKGROUND OF THE INVENTION

1. FIELD OF THE INVENTION

The invention concerns a process for the recovery of lead from lead batteries which are to be scrapped, wherein the batteries are broken up by a single stage or multi-stage mechanical comminution process and freed from battery acid, as well as apparatus for carrying out the process.

2. DESCRIPTION OF THE PRIOR ART

Processes of this type have been known for a long time. In these processes, e.g. as described in German Patent Specification No. 1,224,935, the batteries are freed from the battery acid and broken or coarsely comminuted and are then fed to an impact mill to be broken into, essentially, grid pieces, coarse to fine particles of grid lead and broken pieces of the poles or terminals and cell connectors; electrode paste of fine particle size; and coarsely broken pieces of the separators and the housing. This battery scrap is then separated by numerous screening and other mechanical or physical separation processes into, essentially, plastics parts, coarse metallic pieces, and fine particle sized components which consist essentially of lead oxide and lead sulphate as well as pure lead powder from the electrode fill.

The component of fine particle size is then reduced to lead in a reduction oven at temperatures of 800° to 1000° C by smelting with coal. The lead corresponds in quality however only to average crude lead with a relatively high content of antimony, which in this form is unsuitable for the manufacture of new batteries. In order to recover lead suitable for the manufacture of new batteries in principle two possibilities exist: one can fuse the crude lead with the coarse pieces of the grid and the terminals and cell connectors and obtain a lead-antimony alloy the antimony content of which is about 50% of that required in grid lead for new batteries and which has to be brought to the antimony content required by alloying with antimony. This possibility, which at first sight appears relatively simple has a number of disadvantages. Thus the result of the costly separation process, namely the division on the one hand into fine particle size components which in the main consist of pure lead and lead compounds, and on the other hand into broken pieces of grid lead, terminals and cell connectors and thus of hard antimonial lead, is for the most part negated. The remaining advantage of the separation is then merely that only about one-half of the material needs to be smelted in the reduction oven. The need for additional antimony for alloying, and particularly the consequential need for expensive pure lead to construct new batteries, are to be seen as very considerable disadvantages. A further significant disadvantage is economic: one can only proceed in this way when the recycling ratio of used batteries is below 50% because for constructing batteries about equal amounts of hard antimonial lead and pure lead are required. The recycling ratio of old batteries is however usually higher than 50% and normally lies between 70 and 80%, so in the use of the above-described possibility there is a constantly growing excess of hard lead, finally leading to the need to sell most of the crude lead recovered from the reduction process on the market, when, more particularly because of the relatively high antimony content and the associated poor properties of the crude lead it has to be sold at relatively low prices.

The other possibility for recovery of lead suitable for construction of new batteries from crude lead recovered as described above consists in refining the crude lead itself to pure lead. However, this refining is relatively costly and because of the antimony content of the lead shows technical difficulties and moreover has as a consequence loss of the antimony contained in the crude lead.

Further disadvantages arise in both of the above-described possibilities and also in all other hitherto known ways of processing old batteries by the reduction with coal. Such reduction requires working temperatures of 800° to 1000° C and thus relatively high evaporation losses of lead as well as antimony arise. Particularly because of the antimony content of the scrap the reduction process results in volatile antimony oxide, causing great difficulties in the purification of the exhaust gases of the process necessary to prevent environmental pollution. The exhaust gases contain not only lead and lead oxide vapours but also considerable proportions of sulphur dioxide and, where the separation of the batteries leaving the impact mill is dispensed with and the plastics parts are burnt during smelting, also hydrochloric acid vapour and other volatile chloride vapours. Numerous and expensive measures are necessary to purify the exhaust gases. A further disadvantage of the antimony content of the scrap charge or the scrap components is the effect of the antimony compounds on the wall covering of the reduction oven, usually leading to the formation of dead hard, brittle compounds at the surface of the covering. These compounds are not resistant to alternating loads and thus after a relatively short service life result in failure of the covering and a necessity for its replacement.

In summary, in spite of the intensive efforts of experts charged with the problem of recovery of lead from used material and in spite of numerous proposals made specifically to improve the re-utilization of lead battery scrap, so far no process has been found for recovery, in a single process stage, of the two lead types, namely pure lead and hard antimonial or grid lead, which are required for the manufacture of new lead batteries, without involving costly separation and sorting processes and without also involving the disadvantages inherent in smelting battery scrap and the need for further processing steps subsequent to smelting, such as refining, alloying with antimony etc.

SUMMARY OF THE PRESENT INVENTION

The underlying task of the invention is therefore to provide a process and apparatus with which it is possible with low expenditure to recover pure lead and hard lead from comminuted battery scrap directly.

According to the invention this is achieved in a process characterised in that the lead compounds are dissolved from broken battery scrap by means of a liquid in which the lead compounds contained in the scrap are soluble, and at least partly dissociate to lead ions and ions of the other components of these compounds and in which the metallic pure lead and hard lead components of the battery scrap and further the plastics parts of the battery scrap are not significantly chemically attacked; in that the lead in solution in the liquid is separated out from the latter by electrolysis as pure lead; and in that the metallic pure lead and hard (grid) lead components are separated by a physical or mechanical separation process from the remaining part of the battery scrap that did not dissolve in the liquid, and thereby the lead contained in the battery scrap is recovered directly in the form of the two types of lead required for manufacturing new lead batteries.

The present process affords numerous advantages over the known processes. Firstly, the apparatus requirement is negligibly small compared with the apparatus required for achieving the same end products, i.e. pure lead and grid lead with an antimony content of 5 - 7% by known processes. Furthermore, in the present process, by a suitable selection of the liquid it becomes possible to obtain oxygen exclusively as the waste gas of electrolysis, whereby the whole waste gas problem arising in all known processes at the reduction stage and requiring numerous and expensive purification measures is obviated. A further decisive advantage of the present process is that when using the same liquids with which the electrolysis results in oxygen as the waste gas, the lead is obtained in the electrolysis as spongey lead or as fine pure lead powder, whereby the additional expense of a lead pulverising plant necessary in all known process is dispensed with. Further, the present process has the considerable advantage that in view of the yield of the electrolytically deposited lead in the form of pure lead, refining of lead and thus expensive refining plant naturally required therefor, and which are required in the above-mentioned second possibility, are dispensed with; alternatively, the need to buy expensive pure lead and additional antimony required by the above-mentioned first possibility for the manufacture of new batteries is also dispensed with.

Additional advantages of the present process include: its low working temperature which can be held under 100° C without difficulty, and the full or complete avoidance of vaporisation losses of lead or antimony resulting therefrom; the possibility of a complete processing of even the metal-containing parts remaining bonded to the plastics components of the scrap and a consequential obviation of metal losses during the separation; the spatially separated yield of the pure lead in the electrolytic cell and the antimony-containing grid lead and plastics parts of the scrap in a dissolution vessel, and the additional possibility of an automatic separation of the grid lead from the plastics components in the dissolution vessel by a suitable choice of the density of the said liquid. The gravity separation automatically results in separation into pure lead, antimony-containing grid lead and plastics parts resulting in eliminating sorting devices required by all hitherto known processes and unavoidable metal losses therein. Thus because all the factors leading to metal losses in the known processes are eliminated there results a complete recovery of the metal contained in the scrapped batteries, which, when using a recycling ratio of 100% makes it superfluous to charge in fresh metal.

In the present process, to achieve environmentally favourable exhaust gases during electrolysis, expediently an alkali is used as the liquid. It is however remarked that the liquid may be an acid and that with certain acids it is possible to obtain oxygen only as the waste gas of electrolysis.

In a preferred embodiment of the present process, in order to recover pure lead powder directly usable for the manufacture of electrode filler and to precipitate spongey lead consisting of such powder during electrolysis, the said liquid is an aqueous alkaline solution, preferably an alkali metal hydroxide, ammonia, alkali metal carbonate, or ammonium carbonate solution with a concentration of at least 3M. It is advantageous to use an n-molar solution of where $n > 5$; and preferably $8 < n < 12$. To improve the solubility of the lead compounds in the aqueous alkaline solution and also to improve the precipitation of lead powder during electrolysis the solution expediently contains at least one organic compound having a plurality of hydroxyl or amino groups, or which is converted by reaction with the alkaline solution into such a compound. Examples are molasses, sugar, mannitol, glycerol, glycol, neopentyl-glycol, tartaric acid, citric acid, alkali tartrates and triethanolamine. To achieve an optimal solubility of the lead compounds in the alkaline solution and also to achieve optimum conditions for the precipitation of lead in powder form in electrolysis it is advantageous to use as an addition an organic compound with 5 to 8 hydroxyl groups, preferably molasses or crude sugar.

To dissolve out the lead compounds from the battery scrap, expediently the amount of the solution used is greater than, preferably 4 to 6 times greater than, the weight of the charge of battery scrap. When the liquid is an aqueous alkaline solution with the above mentioned additives the weight of the latter is preferably 1 to 25%, more preferably 4 to 12%, of the weight of the charge of scrap.

It is particularly advantageous to use a liquid which has the additional property of reacting with the lead sulphate contained in the battery scrap by a partial conversion or transformation to a sulphate which is soluble in the liquid, and to obtain a lead compound which at least partially dissociates in and is soluble in the liquid. The lead can then be recovered by electrolysis of the liquid. One may expediently use a lye as the liquid, the solubility of the said sulphate in the lye resulting from the reaction of lead sulphate therewith decreasing with rising concentration of the lye when the latter is more than 5M, the decrease being preferably by a factor of more than 20 within the concentration range of a 5 to 12M lye. The sulphate can then be removed by concentrating the lye. Particularly suitable lyes are alkali lyes, preferably soda lye (caustic soda), or caustic potash. When using such a lye the process is advantageously carried out by passing the lye through the scrap, the concentration of the lye being maintained so at such a level that the solutive power of the lye after being passed through the scrap is just sufficient for the sulphate resulting from the reaction with the lead sulphate. After passage of the lye through the scrap the concentration is raised again to compensate for the reaction of part of the lye with the lead sulphate; in this way the sulphate arising from the reaction of the lead sulphate with the lye is at least partially precipitated. The precipitation may with advantage be undertaken in an elutriation vessel by concentrating the lye in this vessel. The lye may if desired simply be circulated through the battery scrap and the elutriation vessel, and this circulation may in principle be by passing the lye through only the elutriation vessel and the scrap, when after the reaction of the whole of the lead sulphate contained in the scrap with the lye and the precipitation of the greater part of the sulphate, electrolysis of the lye takes place. To this end however, a relatively large amount of lye is required, to get the whole of the lead compounds resulting from the reaction of the lead sulphate with the lye, as well as the lead oxide contained in the scrap charge, into solution in the lye.

However, considerably smaller amounts of lye may be used and further technological advantages may be obtained if an electrolytic cell is connected in the circuit, preferably downstream of the elutriation vessel, and the lye is electrolysed therein to precipitate the lead. By maintaining a constant flow of the lye and adjusting the flow rate so that the concentration of the at-least-partially-dissociated lead compounds in the lye, which concentration depends on the solubility of the lead compounds in the lye and its through-flow velocity, is maintained under the precipitation threshold at the outlet of the elutriation vessel and by adjusting the working voltage and thus the current flow in the electrolysis, the concentration of the lead compounds in the lye leaving the electrolytic cell is at most 80% and can be less than 40% of the concentration in the lye entering the electrolytic cell.

In the above-mentioned preferred embodiment of the present process particularly favourable results may be achieved when the said liquid is more than 5M, preferably 7 to 10M, caustic soda or caustic potash and the weight of the utilized amount of liquid is 4 to 6 times, preferably approximately 5 times, the weight of the battery scrap charge. Desirably also the caustic soda or potash is provided with an addition of molasses, preferably fodder molasses, the weight of which is 8 to 12%, preferably 10%, of the weight of the charge. The scrap is suitably introduced into a dissolution vessel and the caustic soda or potash passed into this vessel, preferably with agitation of the scrap in the vessel. The lye is passed to an elutriation vessel and concentrated to make up for loss of concentration due to reaction with lead sulphate in the dissolution vessel, with precipitation of the sodium or potassium sulphate. Then the desulphated lye is electrolyzed in a cell having a diaphragm between the cathode and the anode, at a working voltage of more than 2V, preferably between 2.5 and 3.5 V to precipitate pure powdery lead in the cathode space and release oxygen at the anode. Finally the lye is re-circulated to the dissolution vessel for further dissolving of the lead compounds contained in the battery scrap. The temperature during electrolysis and preferably also during passage through the battery scrap is suitably maintained at 50° to 90°, preferably at about 80° C.

In the present process an impact mill is preferably used to comminute the batteries to a maximum particle size of 15 mm, preferably 10 mm; during the comminution process the battery acid is expediently allowed to flow away. The comminuted scrap is then expediently washed to remove the remainder of the acid and preferably dried before treated with the lye.

The dissolution of the lead compounds and the electrolysis be carried out in a twin chambered vessel, the two chambers being separated from each other by a partition wall which is liquid-permeable. Preferably the wall is formed from a mesh or filter plate having coarse pores, and the electrolysis is carried out simultaneously with the dissolution.

However, for various reasons it is technologically more advantageous to carry out the dissolution in one vessel and the electrolysis in a separate electrolytic cell. Then in a first process stage one may dissolve the whole of the lead compounds contained in the battery scrap charge. To this end a quantity of the said liquid is used which is sufficient therefor and then in a second process stage this liquid containing the lead compounds in a dissolved or at least partially dissociated form is electrolyzed, preferably until at least 90% of the lead contained in the liquid is precipitated as pure lead; or the liquid may be passed in circulatory flow through the dissolution vessel and the electrolytic cell. The electrolysis of the liquid is preferably carried out simultaneously or at least overlapping in time with the dissolution of the lead compounds from the battery scrap.

Circulation of the liquid in a closed circuit is more advantageous having regard to the required amount of liquid and for the sake of continuous running of the process.

Generally in the present process it is recommended that the said liquid should have its temperature during electrolysis brought to the range from 20° to 200° C, preferably between 40° and 100° C, in order to increase ionic mobility in the liquid and to decrease its viscosity and/or, during dissolving of the lead compounds from the battery scrap, to increase its solubilitive power for the lead compounds. Naturally the process may also be carried out at room temperature, as will be clear from the previously mentioned temperature range, but by a moderate heating to, for instance, 50° to 80° C not only can savings be made in the electrical consumption necessary for electrolysis but also a higher solubility in the liquid of the said lead compounds may be achieved and thus a decrease in the amount of liquid required.

It is of considerable advantage, furthermore, in the present process to produce relative movement between the scrap and the liquid, preferably by stirring the scrap in the liquid or by producing a flow of the liquid through the scrap, in order to prevent local oversaturation in the liquid and to accelerate the dissolution of the lead compounds.

In the present process the plastics components of the scrap may expediently be separated from the remainder of the scrap by gravity separation. Advantageously the separation of the plastics parts from the rest of the scrap may be undertaken in the liquid and to this end a liquid is used which has a density greater than or at least approximately equal to the density of the plastics parts of the scrap. The scrap is then expediently circulated in the liquid, preferably, by stirring the scrap in the dissolution vessel and in this way the plastic parts are freed and brought to float in the liquid or, in the case of an approximately equal density of the liquid and the plastics parts, will be suspended in the liquid above the metallic components of the scrap.

There remain in the dissolution vessel after the dissolution of the lead compounds from the battery scrap not only the plastics parts of the scrap and the broken pieces of the grid and the terminals and the cell connectors, but also generally some pure metallic lead powder originating from the cathode fill of the scrapped batteries. This would lead, by fusion with the broken pieces of grid, terminals and cell connectors to a slight lowering of the antimony content of the hard lead resulting from the fusion, making it necessary to provide a slight additional alloying of antimony; it is thus advantageous to separate by means of the above-mentioned physical or mechanical separation process the hard lead components of the battery from the pure lead powder originating from the cathode filler, preferably by screening from the rest of the components, and then expediently to add it to the pure lead powder recovered from electrolysis.

The invention further concerns apparatus for carrying out the present process which is characterized in that it has at least two chambers or vessels which are separated from each other for solid matter but which communicate, or can be placed into communication, for liquid flow, one of which constitutes a dissolution chamber or dissolution vessel to dissolve the lead compounds contained in the scrap and the other of which constitutes an electrolytic cell for the electrolytic precipitation of lead; a cathode and an anode and a diaphragm between the cathode and the anode; means for establishing a liquid-permeable connection, which is however impermeable for solid matter, between the two chambers or vessels; a DC current supply; and current-conducting means for connecting the electrolytic cell to the current supply, all for use with liquid passable to the dissolution chamber or vessel as the solvent for dissolving the lead compounds from the battery scrap and also feedable to the electrolytic cell as the electrolyte.

Advantageously, the apparatus may be provided with means for producing relative movement between the battery scrap and the said liquid in the solution chamber or solution vessel, preferably with an agitator for agitating the scrap in the liquid, and further with heating means to heat the liquid in the electrolytic cell and/or in the solution chamber or solution vessel, preferably in the form of at least one heating jacket.

In the present apparatus both the chambers may expediently be arranged in a common container and separated from each other by a fine mesh or a filter plate having large pores. A preferred constructional form of the apparatus for carrying out the present process consists nevertheless of a first vessel constituting a dissolution vessel and a second vessel constituting the electrolytic cell, a first liquid-connection pipe between the two vessels for supplying lead-containing liquid from the dissolution vessel to the electrolytic cell, a second liquid-connection pipe between the two vessels for supplying at least partially de-leaded liquid from the electrolytic cell to the dissolution vessel, a pump in one of the two liquid-connection pipes to produce a circulation of liquid through the first and second vessels, and preferably filtering means arranged in one or both of the liquid-connection pipes to retain solid matter while simultaneously allowing liquid to pass through. In one of the two liquid-connection pipes, preferably the first, there may advantageously be provided an elutriation vessel provided with means for concentrating the liquid.

BRIEF DESCRIPTION OF THE DRAWINGS

The invention is described by way of preferred embodiments shown in the drawings, wherein.

DESCRIPTION OF THE PREFERRED EMBODIMENTS

Figure 1:
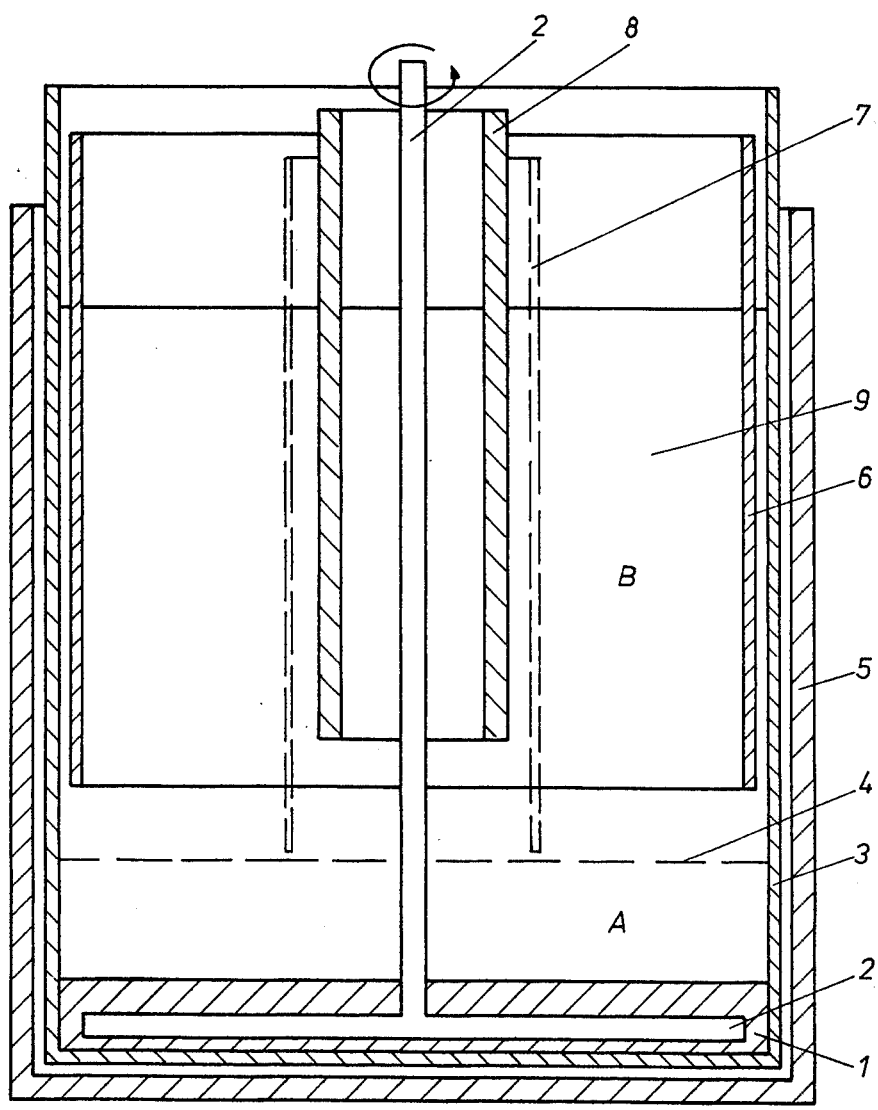
FIG. 1 is a schematic view of the principle of the construction of apparatus suitable for carrying out the present process.

Referring to FIG. 1, a cell 3 is divided by a separator 4 into two chambers connected by the electrolyte 9. Electrolyte-resistant fine metal or plastics meshes or filters with coarse pores are suitable as separation material 4. The comminuted battery scrap 1 is introduced into chamber A and during operation of the cell is intensively agitated or stirred, by means of the agitator 2. In this way and by using a suitable electrolyte 9 it is achieved that all lead compounds present are chemically dissolved yet the metallic lead remains unattacked. Only dissolved lead compounds pass through the separator 4 as ions or complexes into the electrolysis chamber B. Between an anode 8 and a cathode 6 there is an electrolyte-resistant diaphragm 7. The latter prevents the mixing of the cathode space or chamber with anodic oxygen whereby chemical attack on the precipitated lead and on the metallic part of the raw material is essentially prevented. A direct contact through the precipitated lead between the cathode and anode is also prevented thereby. The whole cell 3, which for instance consists of plastics or a suitable ceramic material, is surrounded by a heating jacket 5 because working temperatures of between 50° and 100° C have proved to be advantageous. As electrolyte 9 for instance a concentrated alkali lye or alkali metal carbonate solution has proved suitable with appropriate additives to increase the solubility of the lead compounds and for influencing the form of the precipitate of the galvanically deposited and precipitated lead. Among other things nickel is suitable as material for the anode 8 in concentrated alkalis while among other things steel and alkali resistant non-ferrous metals are suitable as material for the cathode 6.

In operation of the cell the lead compounds of the battery scrap are chemically dissolved in chamber A, while metallic lead i.e. grid lead with 5 to 7% antimony and the lead powder still present in the cathode are in contrast scarcely attacked. The lead containing solution passes through the separator 4 into the electrolysis space 13 and is there dissociated cathodically to lead and anodically to oxygen or oxygen and carbon dioxide. The lead precipitates as a fine powdery sponge lead which scarcely adheres to the cathode and which in the main floats on the electrolyte. The separator 4 prevents a sinking of pure lead particles to mix with the raw material. After completion of the electrolysis all lead in the form of lead oxides and lead sulphate is disposed as spongey lead in the chamber B between the cathode 6 and diaphragm 7. The broken grid pieces with their original antimony content, some lead powder of the cathodes and plastics broken pieces not previously separated remain in chamber A.

By means of the present process it is achieved that at temperatures below 200° C battery scrap is processed in a single operational stage directly to antimony containing grid lead on the one hand and pure lead powder on the other. These end products are obtained in a spatially separated form. No environmentally harmful or polluting waste gases or effluents arise and thanks to the powdery nature of the precipitate of the regenerated pure lead the mechanical production of lead powder required for fabrication of batteries becomes unnecessary.

Figure 2:
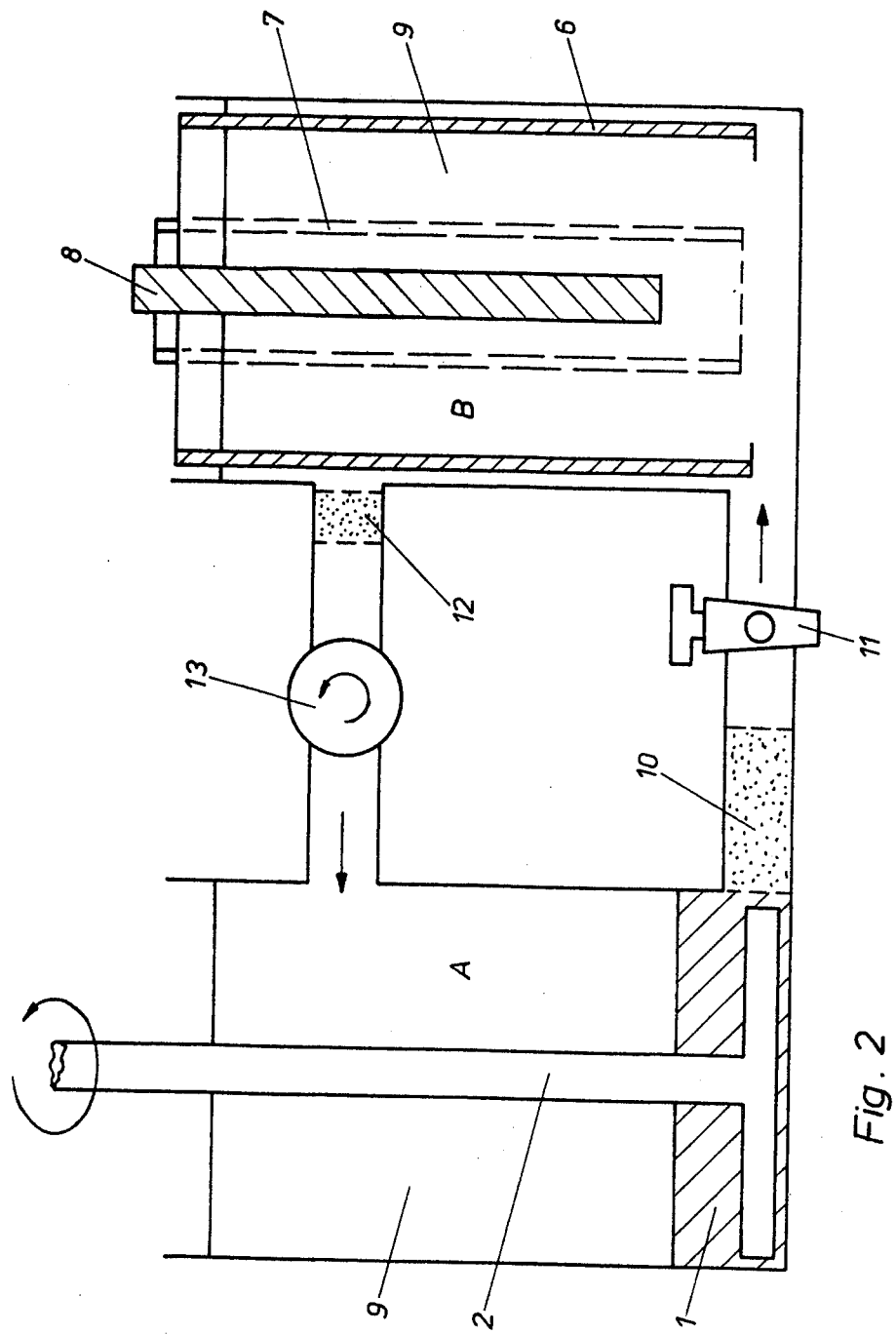
FIG. 2 is a schematic view of the construction of a further apparatus suitable for carrying out the process.

With electrolytes of sufficient solubilitive power for the lead compounds present in battery scrap the regeneration of the scrap to grid lead and pure lead powder may advantageously be carried out in a two-chamber system as shown schematically in FIG. 2. Both the separation of the two end products as well as the operation of the plant are thereby significantly simplified.

Additionally the possibility exists of using in place of the illustrated schematic cell groove or ring cells and to operate a process as a continuous process.

In a preferred embodiment of the process utilizing the cell schematically illustrated in FIG. 1 the old batteries are first coarsely comminuted and then the scrap is broken up e.g. in an impact mill to a particle size of 10 mm maximum. The metal parts are then separated from plastics components of the housing and separators by a flotation separation treatment for example in a liquid having a density of more than 1.5. The lead phase consisting of antimony containing grid pieces, pure lead powder from the cathode body, lead sulphate from the cathode and anode, and lead oxides are brought into chamber A of the electrolytic cell a 30% (10 N) NaOH solution serves as an electrolyte 9 and contains as additive 5 weight %, relative to the weight of the scrap, tartaric acid or alkali metal tartrate. The cell is heated by the heating jacket 5° to 50° and the scrap 1 and thus also the electrolyte 9 are intensively mixed during the whole duration of the electrolysis by means of the agitator 2. The solubilities of the lead compounds in this electrolyte at 50° C amount to: lead dioxide = 38.4 g/l; while for lead (II) compounds 89.5 g/l.

In the course of electrolysis oxygen is liberated at the nickel anode 8 and at the copper cathode 6 metallic lead is deposited as a poorly adhering, mainly floating spongey lead. The electrolysis is carried on until the electrolyte in the chamber A is completely clear. The dissociation voltages of the lead compounds in the electrolyte employed at 50° are for lead dioxide 2.12 V and for lead (II) compounds 1.42 V. The electrolysis was carried out with a voltage of between 2.5 and 3.5 V. The effective current efficiency reckoned on the amount of the precipitated spongey lead amounts to over 70%.

The spongey lead is skimmed, washed and dried at about 80° C. The particle size of the micro-crystalline lead particles amounts to $20\mu$ on average. The residue in chamber A is separated from the electrolyte, washed and dried. It consists of grid pieces, i.e. of hard lead with the original antimony content, and some pure lead powder from the cathode which can be separated from the grid lead by simple screening.

In another embodiment of the process utilizing the apparatus schematically shown in FIG. 2, first as with the previous example the comminuted product 1 with a maximal particle size of 15 mm is brought without separation of the plastics parts into the solution chamber and there under intensive agitation leached at 80° C in the electrolyte 9. The lead-containing solution flows downwardly through the filter 10 and through the regulating cock 11 into the electrolytic chamber B. This consists of, for example, an annular steel cathode 6 and a central round nickel anode 8. The solution from which the lead has been removed electrolytically at 80° C flows upwardly through a filter 12 and the circulation pump 13 back into the chamber A.

The electrolyte consists of, for instance, 10 M caustic potash to which 200 ml glycol per kg of battery scrap has been added. Solubilities in the electrolyte employed amount at 80° to 61.4 g/l for lead oxide and 130 g/l for lead (II) compounds. The dissociation voltages at 80° C are for $PbO_2$ 1.78 V and for lead (II) compounds 1.05 V. Electrolysis took place at a working voltage of 2.5 to 3.5 V.

After the complete throughput, chamber A contained grid lead with the original antimony content, some lead powder from the cathode and broken pieces of plastics. These were separated from the lead by a known method and this was done considerably more easily because the powder-fine specific lighter lead compounds were absent. The plastics pieces were next freed from any lead or lead compound sticking thereto by a leaching process.

All the lead from the dissolved lead compounds precipitates in the electrolytic chamber B as the finest pure lead sponge. This hardly adheres to the cathode and floats on the electrolyte. The particle size is about 20 microns. The precipitating sponge lead may after washing and drying be used directly for the manufacture of new batteries.

What is claimed is:

1. A process for recovering lead from scrap lead-acid storage batteries, which comprises the steps of:

placing in a dissolving vessel comminuted battery scrap comprising pieces of antimonial lead from grid plates and particles of lead metal, lead oxides and lead sulphate, said scrap being free of battery acid;

feeding into said dissolving vessel an aqueous solution of an alkaline material selected from the group consisting of alkali metal hydroxides, alkali metal carbonates, ammonium hydroxide and ammonium carbonate, wherein the concentration of said alkaline material in said aqueous solution is at least 5 molar, and thereby dissolving said lead oxides and lead sulphate in said aqueous solution to provide lead ions in said aqueous solution;

feeding said aqueous solution containing dissolved lead oxides and lead sulphate from said dissolving vessel into an electrolysis cell while retaining undissolved antimonial lead and lead metal in said dissolving vessel;

subjecting said aqueous solution in said electrolysis cell to electrolysis to form particles of lead metal at the cathode thereof and removing said particles of lead metal from said electrolysis cell.

2. A process according to claim 1 in which the concentration of said alkaline material in said aqueous solution fed into said dissolving vessel is from 8 to 12 molar.

3. A process according to claim 2 wherein said aqueous solution of said alkaline material also contains an additive selected from the group consisting of molasses, sugar, mannitol, glycerol, glycol, neopentyl glycol, citrates, tartrates, triethanolamine and other organic compounds having a plurality of hydroxyl and/or amino groups effective for increasing the solubility of lead sulphate and lead oxides in the aqueous alkaline solution, wherein the amount of said additive is from 1 to 25% by weight, based on the weight of said comminuted battery scrap.

4. A process according to claim 3, wherein said additive is selected from the group consisting of molasses, crude sugar and other organic compounds having 5 to 8 hydroxyl groups.

5. A process according to claim 4, wherein the amount of said additive is from 4 to 12% by weight, based on the weight of said comminuted battery scrap.

6. A process according to claim 2, wherein the weight of said aqueous solution is from 4 to 6 times the weight of said comminuted battery scrap.

7. A process according to claim 2, wherein the initial concentration of said alkaline material in said aqueous solution is such that after its action on the comminuted battery scrap its concentration is sufficient to maintain in solution sulphates obtained by reaction of said alkaline material with said lead sulphate, then said solution is concentrated to precipitate at least part of the alkaline sulphates, the precipitates are removed from said solution and then said solution is electrolyzed.

8. A process according to claim 2 wherein the electrolysis is carried out at an electrolysis voltage above 2 volts to precipitate lead at the cathode and release oxygen at the anode.

9. A process according to claim 2 wherein the solution is maintained at a temperature of between 20° and 200° C during the electrolysis.

10. A process according to claim 2 wherein the comminuted battery scrap has a maximum particle dimension of 15 mm.

11. A process according to claim 1 wherein the comminuted battery scrap fed to said dissolving vessel also comprises pieces of plastic which remain in the dissolving vessel with undissolved antimonial lead and lead metal and including the step of physically separating the plastic pieces from said undissolved antimonial lead and lead metal by gravity separation in a liquid in which the plastics pieces float or are suspended for removal.

12. A process according to claim 1 wherein the undissolved antimonial lead and undissolved lead metal are removed from said dissolving vessel and then are separated from each other.

13. A process according to claim 2 wherein said alkaline material is sodium hydroxide or potassium hydroxide, said aqueous solution is continuously circulated through said dissolving vessel, then through a concentration zone wherein it is concentrated to restore the initial concentration of alkaline material and precipitated sulphate of said alkaline material is removed, and then the solution is fed again to said dissolving vessel.

14. A process according to claim 13, wherein electrolysis of said solution is performed before or after the concentration zone, in which electrolysis sufficient lead is removed to keep the concentration of lead compounds in the solution, after the concentration, below the solubility limit thereof.

15. A process according to claim 14 wherein from 80% to 40% of the lead in the solution remains in the solution after electrolysis.

16. A process according to claim 1 wherein the action of said solution on the comminuted battery scrap and the electrolytic deposition of lead take place simultaneously in zones of a reaction vessel separated by a partition permeable to the solution, but substantially non-permeable to solids.

* * * * *